(12) United States Patent
Diefenbaugh et al.

(10) Patent No.: US 11,249,534 B2
(45) Date of Patent: *Feb. 15, 2022

(54) APPARATUS AND METHODS FOR REDUCED COMPUTING DEVICE POWER CONSUMPTION

(71) Applicant: Intel Corporation, Santa Clara, CA (US)

(72) Inventors: Paul Diefenbaugh, Portland, OR (US); Arthur Runyan, Folsom, CA (US); Gary Smith, El Dorado Hills, CA (US); Kathy Bui, Hillsboro, OR (US); Ajay Saini, Hillsboro, OR (US); Vishal Sinha, Portland, OR (US); Yifan Li, Beaverton, OR (US); Yong-Joon Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/087,357

(22) Filed: Nov. 2, 2020

(65) Prior Publication Data

US 2021/0116985 A1   Apr. 22, 2021

Related U.S. Application Data

(63) Continuation of application No. 16/235,600, filed on Dec. 28, 2018, now Pat. No. 10,824,216.

(51) Int. Cl.
*G06F 1/00* (2006.01)
*G06F 1/3218* (2019.01)
(Continued)

(52) U.S. Cl.
CPC .......... *G06F 1/3218* (2013.01); *G06F 1/3287* (2013.01); *G06F 1/3296* (2013.01);
(Continued)

(58) Field of Classification Search
CPC .... G06F 1/3206; G06F 1/3218; G06F 1/3287; G06F 1/3296; G09G 2310/08;
(Continued)

(56) References Cited

U.S. PATENT DOCUMENTS 6,263,396 B1   7/2001  Cottle et al.
10,824,216 B2  11/2020  Diefenbaugh et al.
(Continued)

OTHER PUBLICATIONS

United States Patent and Trademark Office, "Notice of Allowance and Fee(s) Due," issued in connection with U.S. Appl. No. 16/235,600, dated Jun. 29, 2020, 10 pages.

*Primary Examiner* — Nitin C Patel
(74) *Attorney, Agent, or Firm* — Hanley, Flight & Zimmerman, LLC

(57) ABSTRACT

Methods, apparatus, systems and articles of manufacture are disclosed for reduced computing device power consumption. Example methods disclosed herein includes detecting frame updates corresponding to input frames to be presented by a display, and causing a programmable timer to generate second interrupts corresponding to first interrupts generated by a display engine, the second interrupts to be generated when there are no frame updates detected for at least a first duration of time defined by a first threshold. Example methods further include causing the display engine to transition to a low power state when (1) the programmable timer is configured to generate the second interrupts and (2) no frame updates have been detected for at least a second duration of time following the first duration of time, the second duration of time defined by a second threshold.

20 Claims, 5 Drawing Sheets

(51) Int. Cl.
   *G06F 1/3287* (2019.01)
   *G06F 1/3296* (2019.01)
   *G09G 5/00* (2006.01)

(52) U.S. Cl.
   CPC ......... *G09G 5/006* (2013.01); *G09G 2310/08* (2013.01); *G09G 2320/103* (2013.01); *G09G 2330/022* (2013.01); *G09G 2340/0435* (2013.01)

(58) Field of Classification Search
   CPC ..... G09G 2330/022; G09G 2340/0435; G09G 5/006; Y02D 10/00
   See application file for complete search history.

(56) References Cited

U.S. PATENT DOCUMENTS

| | | |
|---|---|---|
| 2011/0090204 A1 | 4/2011 | Yamazaki et al. |
| 2012/0254645 A1 | 10/2012 | Jeganathan et al. |
| 2016/0329024 A1 | 11/2016 | Maeda |
| 2019/0138076 A1 | 5/2019 | Diefenbaugh et al. |

APPARATUS AND METHODS FOR REDUCED COMPUTING DEVICE POWER CONSUMPTION

RELATED APPLICATIONS

This patent arises from a continuation of U.S. patent application Ser. No. 16/235,600, U.S. Pat. No., 10,824,216 issued on Nov. 03, 2020, which was filed on Dec. 28, 2018. U.S. patent application Ser. No. 16/235,600 is hereby incorporated herein by reference in its entirety.

FIELD OF THE DISCLOSURE

This disclosure relates generally to computing devices and, more particularly, to apparatus and methods for reduced computing device power consumption.

BACKGROUND

In recent years, demand has increased for improving the battery life of computing devices to enable longer term, high processing-load mobile computing. Computing devices and components of computing devices have a plurality of modes, ranging from powered-off to fully-operational. Computing devices and components of computing devices are sometimes capable of operating in intermediary power-saving modes (e.g., sleep modes).

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
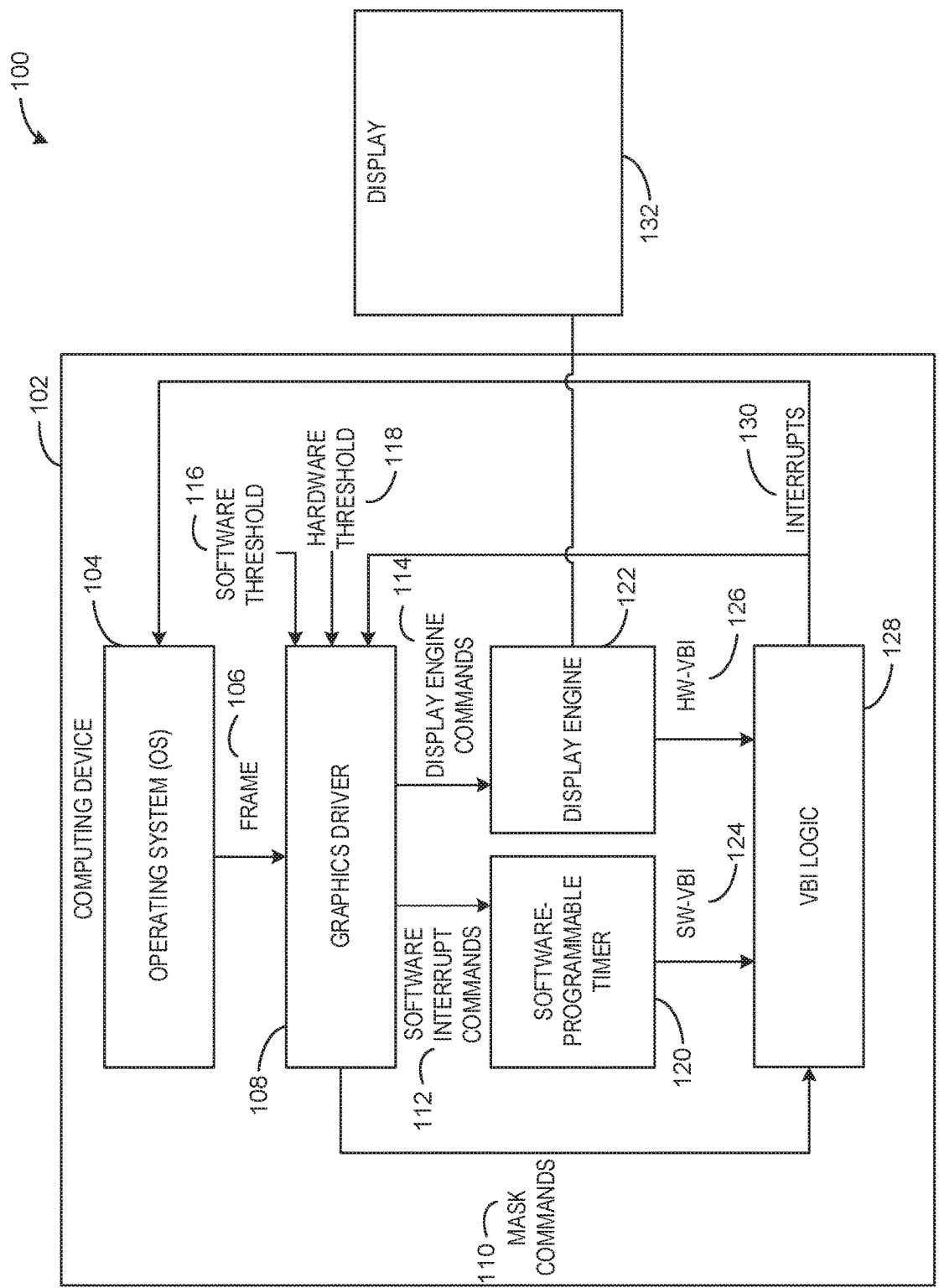
FIG. 1 is an example environment for reducing power consumption of an example computing device as described in accordance with the teachings of this disclosure.

Computing devices include display engines to process frames (e.g., images) to be displayed on a display device and to serve as an interface between the computing device and the display. To reduce power consumption from the display engine, technologies such as Panel Self Refresh (PSR) have been developed, whereby a display device can store a frame in a local storage (e.g., a cache) and refresh this frame on the display device if there is no update from the display engine. For example, if a user of a computing device leaves the computing device on a static screen, the display device can merely refresh the frame from the local storage display device instead of causing the display engine to continually transmit an identical frame.

When generating images on the display device, the display engine may generate interrupts between frames. For example, one common type of interrupt is a Vertical Blanking Interrupt (VBI), also referred to as a VBLANK interrupt, which is a signal during a time period in which no visual information is conveyed between frames. Other interrupts, such as a horizontal blanking interval, and VSYNC (Vertical Sync) interrupts, similarly act as intermediary intervals between frames. As used herein, the term "interrupt" refers to a display frame timing event. In some cases, an interrupt can be utilized to carry other information, such as metadata regarding media being presented. Interrupts typically occur at a regular rate (e.g., every 16.67 milliseconds for a 60 Hz display) and can additionally be utilized by other software and/or hardware components of a computing device for timing purposes.

Software and/or hardware components call interrupts (e.g., register for interrupts) to synchronize rendering of frames, and, therefore, require the display engine to continually generate the interrupts even if a new frame is not being presented. Further, applications may fail to unregister for interrupts even when the applications have little or no rendering activity. Some native applications (e.g., Windows Desktop Composition Manager) also continue to request interrupts for some number of frames after new frames are composed. Such interrupt requests thereby require the display engine timing generator counters to continue running, preventing the display engine from entering into a low power state, such as a deep-sleep mode. Overall power consumption of the computing system remains high as the display engine remains operational even when no frame update is detected and the system is pervasively idle. On system on chip (SoC) devices, this can result in reduced battery life, which is a critical performance metric to enable, among other things, mobile computing.

Example methods, apparatus, systems and articles of manufacture (e.g., physical storage media) to dynamically analyze media signals and accurately trigger watermark encoding outage alarms for reduced computing device power consumption are disclosed herein. Example techniques disclosed herein generate software interrupts using a programmable timer synchronized with hardware interrupts when a first duration (e.g., a "software threshold" duration) has elapsed without a frame update (e.g., the frames to be displayed are identical for the duration). Example techniques disclosed herein further transition the display engine to a low power state (e.g., a deep-sleep state) after a second duration (e.g., a "hardware threshold" duration) has elapsed without a frame update, thereby fully transitioning the system to use the software generated interrupts.

The display engine generates an interrupt upon start-up and prior to scanning out the first scan-line of a new frame. In response to a new frame, sometimes referred to herein as a flip, techniques disclosed herein enable the display engine to return to being the primary source of interrupts. In some example methods, apparatus, systems and articles of manufacture (e.g., physical storage media) disclosed herein, when the new frame is encountered, if the display engine is in the low power state, the display engine is transitioned to an operational state at a specific time to begin producing hardware-generated interrupts ("hardware interrupts"), beginning with the start-up interrupt, synchronized with the currently-generated software interrupts. Such synchronization enables a transition that is within an acceptable tolerance range of the operating system (e.g., less than 1-2 milliseconds). Similarly, in some examples, when the software threshold is satisfied, the software interrupts are generated to be in substantially synchronized (e.g., within 1-2 milliseconds) with the hardware interrupts generated by the display engine.

In some example techniques disclosed herein, hardware interrupts are masked when both the software interrupts and the hardware interrupts are being generated (e.g., during the time period between satisfying the software interrupt and the hardware interrupt). In some such examples, the hardware interrupts are generated for a duration beyond the software threshold and are masked such that they can be readily utilized if a frame update occurs, without having to initialize the display engine and synchronize the hardware interrupts with the software interrupts.

Example techniques disclosed herein enable a hybrid interrupt offloading approach, where a computing device can alternately utilize software interrupts and hardware interrupts in a scheme that optimizes power consumption of the display engine and other components of the computing device. Such techniques aggressively power manage the display engine, enabling substantial power savings (e.g., 10-20% overall power savings have been observed in experiments), particularly when combined with PSR technology. Further, by intelligently switching between hardware and software interrupts, the hybrid interrupt offloading approach deterministically avoids software-hardware race conditions and the resulting visual artifacts (e.g., tears) such race conditions create, while allowing the display engine to be aggressively power managed even when applications persistently request interrupts. Specifically, in some examples disclosed herein, race conditions are avoided by ensuring that the display engine generates the hardware interrupts whenever an updated frame is about to be scanned-out, while software interrupts are employed only when the software threshold is satisfied. Example techniques disclosed herein utilize the combination of a tuned software threshold and a tuned hardware threshold that optimize power usage without resulting in fast-switching hysteresis effects from continually power-cycling the display engine.

FIG. 1 is an example environment 100 for reducing power consumption of an example computing device 102 as described in accordance with the teachings of this disclosure. The environment 100 includes an example computing device 102, an example operating system (OS) 104, an example frame 106, an example graphics driver 108, example mask commands 110, example software interrupt commands 112, example display engine commands 114, an example software threshold 116, an example hardware threshold 118, an example software-programmable timer 120, an example display engine 122, an example software vertical blanking interrupt (SW-VBI) 124, an example hardware vertical blanking interrupt (HW-VBI) 126, example vertical blanking interrupt (VBI) logic 128, example interrupts 130, and an example display 132.

The example computing device 102 of the illustrated example of FIG. 1 is a device for processing computer-readable instructions. The computing device 102 may be a System on Chip (SoC) device, such as a mobile phone, a wearable device, a tablet, etc. In some examples, the computing device 102 includes the example display 132 as an integrated component of the computing device 102 while, in other examples, the computing device 102 communicates with an external implementation of the display 132 (e.g., a smart-TV, an external monitor, etc.).

The example OS 104 of the illustrated example of FIG. 1 manages basic functions of the computing device 102. In some examples, the OS 104 interfaces with the components of the computing device 102 to provide basic user functionality (e.g., generate interfaces, receive and process signals from input devices, etc.). In some examples, the OS 104 communicates with one or more drivers, such as the graphics driver 108, which serve as software and/or hardware designed to operate a specific component of the computing device 102. In some examples, the OS 104 interacts with one or more software programs that register for interrupts from the VBI logic 128.

The example frame 106 of the illustrated example of FIG. 1 is an image to be presented on the display 132. In some examples disclosed herein, the frame 106 is referred to as an input frame, as it is an input to the graphics driver 108. In some examples, the OS 104 generates the frame 106 and communicates it to the graphics driver 108 to be ultimately communicated as pixel data and frame timing signals to the display 132. The frame 106 may be one of a plurality of frames generated at a particular frame rate when the computing device 102 is in operation. In some examples, the frame rate of frames generated by the OS 104 is different from a frame rate of the display 132.

The example graphics driver 108 of the illustrated example of FIG. 1 processes frames and controls generation of interrupts. The graphics driver 108 of the illustrated example accesses the frame 106 and determines whether the frame 106 represents an update (e.g., a change) relative to a prior frame accessed by the graphics driver 108. In some examples, the graphics driver 108 accesses the software threshold 116 and the hardware threshold 118. In some examples, both the software and hardware thresholds 116, 118 are preconfigured in the graphics driver 108. The graphics driver 108 of the illustrated example issues the mask commands 110 to the VBI logic 128 to mask hardware interrupts (e.g., the HW-VBI 126) when software interrupts are simultaneously generated. Further, the graphics driver 108 of the illustrated example issues software interrupt commands 112 to cause the software-programmable timer 120 to generate software interrupts (e.g., the SW-VBI 124) and display engine commands 114 to cause the display engine 122 to transition between an operational state and a low power state (e.g., a deep sleep state). Further detail of the graphics driver 108 and the techniques performed by the graphics driver 108 are described in connection with FIGS. 2 and 3.

The example mask commands 110 of the illustrated example of FIG. 1 are commands to cause the hardware interrupts such as the HW-VBI 126 to not be utilized by software and/or hardware components requesting (e.g., registering for) interrupts when software interrupts such as the SW-VBI 124 are being generated. The mask commands 110 of the illustrated example enable the display engine 122 to remain powered on and to continue generating hardware interrupts after the software threshold has been satisfied and while software interrupts are being generated, thereby enabling and facilitating a switch back to hardware interrupts if a frame update is encountered.

The example software interrupt commands 112 of the illustrated example of FIG. 1 cause the software-programmable timer 120 to generate the SW-VBI 124. In some examples, the software interrupt commands 112 additionally or alternatively cause the software-programmable timer 120 to cease generating software interrupts. In some examples, the software interrupt commands 112 include timing information to indicate when the SW-VBI 124 should be generated to synchronize the software interrupts with the hardware interrupts generated by the display engine 122.

The example display engine commands 114 of the illustrated example of FIG. 1 are commands cause a change in power state of the display engine 122. In some examples, the display engine commands 114 cause the display engine 122 to transition from a fully operational state to a low power state, such as a deep-sleep state, where hardware interrupts are no longer generated. The graphics driver 108 intelligently issues the display engine commands 114 to optimize power consumption of the display engine 122 in accordance with techniques further described in association with FIGS. 2 and 3.

The example software threshold 116 of the illustrated example of FIG. 1 is a threshold that, when satisfied, causes the graphics driver 108 to cause the software-programmable timer 120 to issue the SW-VBI 124. In some examples, the software threshold 116 is a duration of time that occurs without a frame update (e.g., a frame that is different from a previously presented frame) to cause software interrupts to be generated. In some examples, the software threshold 116 is a number of interrupts that occur (e.g., as issued by the display engine 122) consecutively without an occurrence of a frame update. Similarly, the software threshold 116 can be a number of identical frames that occur consecutively. Interrupts occur at a regular rate (e.g., every 16.67 milliseconds for a 60 Hz display). Thus, the software threshold 116 can be represented as a number of interrupts and/or a duration of time.

The example hardware threshold 118 of the illustrated example of FIG. 1 is a threshold that, when satisfied, causes the graphics driver 108 to cause the display engine 122 to transition to the low power state. In some examples, the hardware threshold 118 is a duration of time that occurs without a frame update, following the software threshold being satisfied. For example, if the software threshold 118 is set to one second, and the hardware threshold is set to one second, the graphics driver 108 causes the display engine 122 to turn off after two seconds of no frame updates having occurred (e.g., one second after the software threshold 116 was satisfied). In some examples, the hardware threshold 116 is a number of interrupts that occur (e.g., as issued by the display engine 122 and/or the software-programmable timer 120) consecutively without an occurrence of a frame update. Similarly, the hardware threshold 118 can be a number of identical frames that occur consecutively. Again, because interrupts occur at a regular rate, the hardware threshold 118 can be represented as a number of interrupts and/or a duration of time.

The software-programmable timer 120 of the illustrated example of FIG. 1 generates software interrupts, such as the SW-VBI 124. The software-programmable timer 120 of the illustrated example can be any type of timer, such as a Programmable Interrupt Controller (PIC) or an Advanced Programmable Interrupt Controller (APIC) timer. The software-programmable timer 120 of the illustrated example receives the software interrupt commands 112 from the graphics driver 108 and generates and communicates the SW-VBI 124 to the VBI logic 128. While the interrupts generated by the software-programmable timer 120 are sometimes referred to herein as vertical blanking interrupts (VBIs), the software-programmable timer 120 can additionally or alternatively generate any other type of interrupt.

The display engine 122 of the illustrated example of FIG. 1 generates hardware interrupts, such as the HW-VBI 126. The display engine 122 of the illustrated example is a hardware and/or software component capable of generating interrupts when in an operational state. The display engine 122 of the illustrated example transitions to a low power state, such as an off state, or a deep-sleep state, to reduce power consumption in response to the display engine commands 114 from the graphics driver 108. The display engine 122 of the illustrated example communicates the HW-VBI 126 to the VBI logic 128. While the interrupts generated by the display engine 122 are sometimes referred to herein as vertical blanking interrupts (VBIs), the display engine 122 can additionally or alternatively generate any other type of interrupt. In some examples, the display engine 122 communicates pixel data associated with the frame 106 and/or frame timing signals to the display 132 via one or more connections to the display 132. In some such examples, this connection stops communicating pixel data and/or frame timing signals when PSR is entered, and begins communicating pixel data and/or frame timing signals when PSR exits.

The SW-VBI 124 of the illustrated example of FIG. 1 is a software interrupt generated by the software-programmable timer 120 and communicated to the VBI logic 128. The SW-VBI 124 is generated in response to the graphics driver 108 determining that the software threshold 116 is satisfied, and issuing the software interrupt commands 112 to cause the software-programmable timer 120 to issue the SW-VBI 124.

The HW-VBI 126 of the illustrated example of FIG. 1 is a hardware interrupt generated by the display engine 122 and communicated to the VBI logic 128. The HW-VBI 126 of the illustrated example is generated when the graphics driver 108 determines that the hardware threshold 118 is not satisfied and, thus, does not issue the display engine commands 114 to cause the display engine 122 to transition to the low power state (in which the display engine 122 would not issue the HW-VBI 126).

The VBI logic 128 of the illustrated example of FIG. 1 receives the mask commands 110, the SW-VBI 124, and the HW-VBI 126 and performs logic operations to output one of the SW-VBI 124 or the HW-VBI 126 as part of the interrupts 130. The VBI logic 128 determines which of the software and/or hardware interrupts are to be output. For example, if both software interrupts and hardware interrupts are being generated, in some examples the graphics driver 108 issues the mask commands 110 indicating that the hardware interrupts should be masked (e.g., not output), thereby prompting the VBI logic 128 to output the software interrupts as the interrupts 130. In some examples, when only one of the SW-VBI 124 or the HW-VBI is received, the VBI logic 128 outputs whichever interrupt type is received as the interrupts 130. The VBI logic 128 outputs the interrupts 130 to =the OS 104 and/or any software programs on the computing device 102 that have registered to utilize interrupts. In the illustrated example, the VBI logic 128 additionally outputs the interrupts 130 to the graphics driver 108 to enable synchronization of any newly generated interrupts (e.g., such as if the display engine 122 is transitioned to the operational state) with the interrupts 130 currently being output by the VBI logic 128.

The interrupts 130 of the illustrated example are utilized by software programs on the computing device 102 that register for interrupts to be used as timing signals. Depending on the output of the VBI logic 128, ones of the interrupts 130 can be software interrupts from the software-programmable timer 120 or hardware interrupts from the display engine 122.

The display 132 of the illustrated example of FIG. 1 is a device for presenting image data. In some examples, the display 132 is internal to the computing device 102 (e.g., embedded in the computing device 102). The display 132 receives pixel data and frame timing signals from one or more components of the computing device 102.

Figure 2:
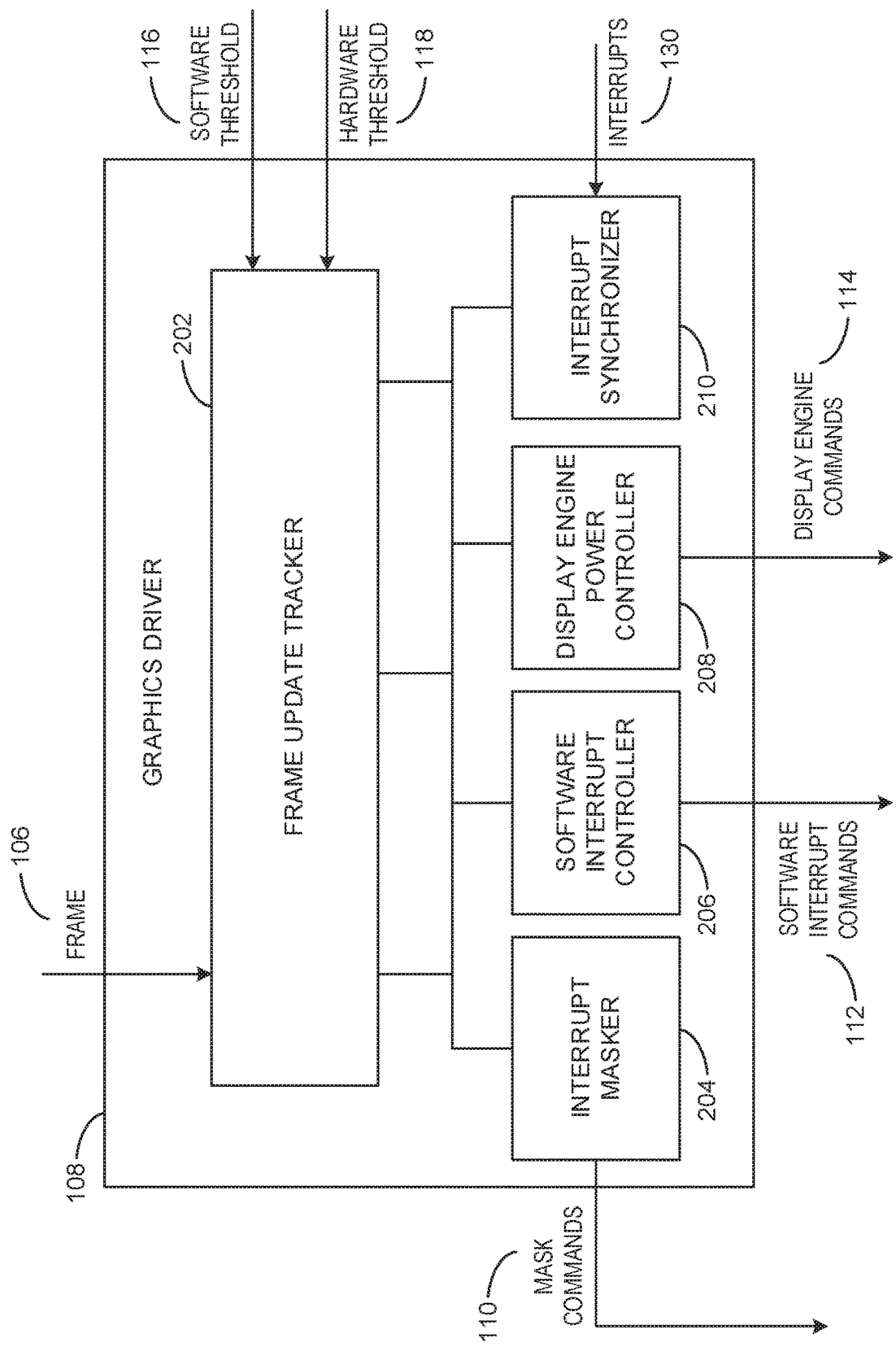
FIG. 2 is a block diagram of an example graphics driver of the example computing device of FIG. 1 as constructed in accordance with the teachings of this disclosure.

FIG. 2 is a block diagram of the graphics driver 108 of the computing device 102 of FIG. 1 as constructed in accordance with the teachings of this disclosure. The graphics driver 108 includes an example frame update tracker 202, an example interrupt masker 204, an example software interrupt controller 206, an example display engine power controller 208, and an example interrupt synchronizer 210.

The example frame update tracker 202 determines whether the frame 106 is a new frame relative to a prior frame received by the frame update tracker 202. For example, the frame update tracker 202 of the illustrated example checks whether the OS 104 has provided a new frame via a flip. In some examples, the frame update tracker 202 may determine if the frame 106 is identical to a previous frame stored in a cache on the computing device 102 and/or on a cache of the display 132. The frame update tracker 202 of the illustrated example determines whether the software threshold 116 has been satisfied and/or whether the hardware threshold 118 has been satisfied. In some example, the frame update tracker 202 includes a counter, timer, and/or tracking component to determine an elapsed duration since the last frame update (e.g., first instance of a unique new frame) and to compare this duration to the software threshold 116 and/or the hardware threshold 118. In some examples, the frame update tracker 202 additionally or alternatively tracks a number of frames and/or a number of interrupts since the last frame update and compares these values to the software threshold 116 and/or the hardware threshold 118.

In some examples, the frame update tracker 202 utilizes a singular tracking counter and compares the duration and/or count value to the software threshold 116 and the hardware threshold 118. In some examples, a separate hardware threshold counter begins tracking (e.g., tracking a duration or a count of frames or interrupts) once the software threshold 116 is satisfied. For example, if the software threshold 116 is one second, and the hardware threshold 118 is two seconds after the software threshold 116, the frame update tracker 202 can either utilize a singular tracking mechanism to determine the hardware threshold 118 is satisfied when no frame updates have occurred for three seconds (e.g., one second to satisfy the software threshold 116 and two seconds to satisfy the hardware threshold 118), or begin a separate tracking mechanism after satisfying the software threshold 116 to track a duration up to the hardware threshold 118 (e.g., to track up to two seconds).

The frame update tracker 202 of the illustrated example resets a duration since a previous frame update and/or resets a count of frames and/or interrupts since a previous frame update in response to a frame update being detected. The frame update tracker 202 of the illustrated example communicates with the software interrupt controller 206 to inform the software interrupt controller 206 as to whether the software threshold 116 has been satisfied. Similarly, the frame update tracker 202 of the illustrated example communicates with the display engine power controller 208 to inform the display engine power controller 208 as to whether the hardware threshold 118 has been satisfied.

The interrupt masker 204 of the illustrated example of FIG. 2 determines and communicates the mask commands 110 to mask the hardware interrupts from the display engine 122 when both the software interrupts and hardware interrupts are being generated. For example, in response to an indication that the software interrupt controller 206 is issuing the software interrupt commands 112 to cause the software-programmable timer 120 to generate software interrupts, and an indication from the display engine power controller 208 that the display engine 122 is in the operational state (e.g., generating hardware interrupts), the interrupt masker 204 can issue the mask commands 110 to the VBI logic 128 to cause the hardware interrupts to be masked. The interrupt masker 204 enables both hardware and software interrupts to be generated simultaneously, by informing the VBI logic 128 of which of the interrupts to output to any software programs registering for interrupts. During the period between the software threshold 116 being satisfied and the hardware threshold 118 being satisfied, both hardware and software interrupts are generated, enabling an easy reversion to using hardware interrupts in the event that a frame update is encountered.

In response to a frame update being encountered when the interrupt masker 204 is issuing the mask commands 110 to mask the hardware interrupts, the interrupt masker 204 can cease issuing the mask commands 110 and/or issue specific mask commands to the VBI logic 128 to cause the VBI logic 128 to unmask the hardware interrupts.

The software interrupt controller 206 of the illustrated example of FIG. 2 issues the software interrupt commands 112 to cause the software-programmable timer 120 to generate software interrupts. In some examples, the software interrupt controller 206 commands the software-programmable timer 120 to generate an initial one of the software interrupts at substantially the same time (e.g., within 1-2 milliseconds) as the next expected occurrence of an interrupt. For example, if the interrupts 130 accessed by the interrupt synchronizer 210 indicate that interrupts are being issued every 16.67 milliseconds, and 12 milliseconds have passed since the previous interrupt, the software interrupt controller 206 can command the software-programmable timer 120 to generate the first software interrupt in 4.67 milliseconds and then continue generating the software interrupts every 16.67 milliseconds, thereby initiating generation of the software interrupts synchronized with the hardware interrupts.

The software interrupt controller 206 of the illustrated example causes the software-programmable timer 120 to cease generation of software interrupts in response to the frame update tracker 202 encountering a frame update. For example, the software interrupt controller 206 can cease the software interrupt commands 112 in response to the frame update tracker 202 encountering the frame update.

The display engine power controller 208 of the illustrated example of FIG. 2 issues the display engine commands 114 to cause the display engine 122 to transition between an operational state and a low power state. In response to the frame update tracker 202 determining that the hardware threshold 118 has been satisfied, the display engine power controller 208 issues the display engine commands 114 to cause the display engine 122 to transition to the low power state, thereby reducing power consumption. In response to the display engine 122 being in a low power state (e.g., deep-sleep, off, etc.) and the frame update tracker 202 detecting a frame update, the display engine power controller 208 can issue the display engine commands 114 to cause the display engine 122 to transition to the operational state. In some examples, the display engine power controller 208 communicates with the interrupt synchronizer 210 to transition the display engine 122 to the operational state at a specific time such that the initial start-up interrupt generated by the display engine 122 occurs substantially at the same time (e.g., within 1-2 milliseconds) as an expected time of the next interrupt based on the interrupts 130.

The interrupt synchronizer 210 of the illustrated example of FIG. 2 accesses the interrupts 130 communicated by the VBI logic 128. In some examples, the interrupt synchronizer 210 determines a time until a next expected interrupt (e.g., based on the standard duration between ones of the interrupts 130). The interrupt synchronizer 210 can additionally or alternatively determine a power-on time for the display engine 122. The interrupt synchronizer 210 can cause the display engine power controller 208 to issue the display engine commands 114 at a specific time such that when the display engine 122 generates an initial start-up interrupt, the start-up interrupt is substantially at the same time as the next expected interrupt. As a result, the interrupts output by the VBI logic 128 are maintained at the regular frequency (within a tolerance range), to avoid creating any artifacts when transitioning from utilizing the software interrupts to the hardware interrupts.

While an example manner of implementing the graphics driver 108 of FIG. 1 is illustrated in FIG. 2, one or more of the elements, processes and/or devices illustrated in FIG. 2 may be combined, divided, re-arranged, omitted, eliminated and/or implemented in any other way. Further, the example frame update tracker 202, the example interrupt masker 204, the example software interrupt controller 206, the example display engine power controller 208, the example interrupt synchronizer 210 and/or, more generally, the example graphics driver 108 of FIG. 2 may be implemented by hardware, software, firmware and/or any combination of hardware, software and/or firmware. Thus, for example, any of the example frame update tracker 202, the example interrupt masker 204, the example software interrupt controller 206, the example display engine power controller 208, the example interrupt synchronizer 210 and/or, more generally, the example graphics driver 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example frame update tracker 202, the example interrupt masker 204, the example software interrupt controller 206, the example display engine power controller 208, the example interrupt synchronizer 210 and/or, more generally, the example graphics driver 108 is/are hereby expressly defined to include a non-transitory computer readable storage device or storage disk such as a memory, a digital versatile disk (DVD), a compact disk (CD), a Blu-ray disk, etc. including the software and/or firmware. Further still, the example graphics driver 108 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
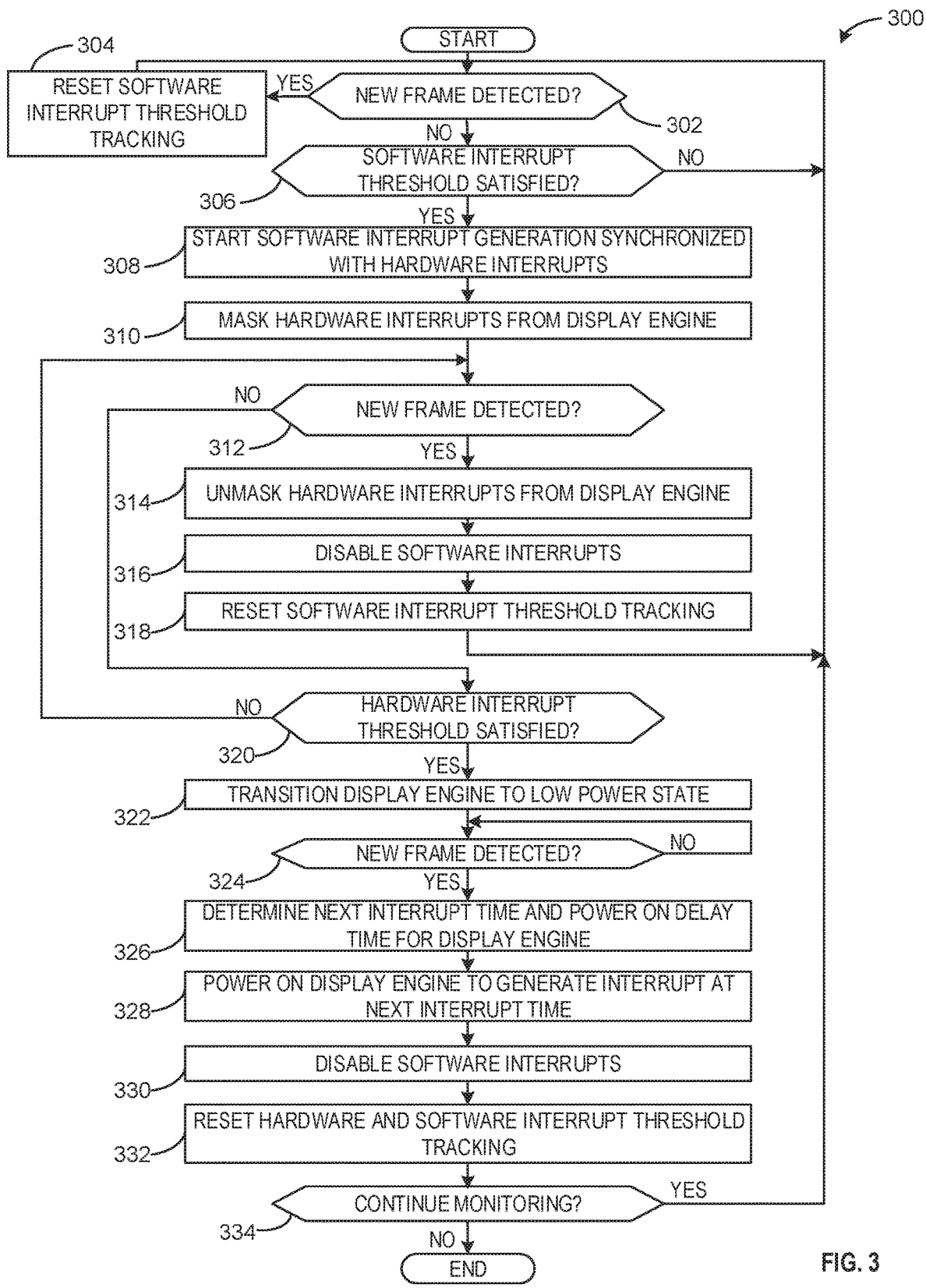
FIG. 3 is a flowchart representative of machine readable instructions that may be executed to implement the graphics driver of FIGS. 1 and 2 for reducing power consumption of the computing device of FIG. 1.

A flowchart representative of example hardware logic, machine readable instructions, hardware implemented state machines, and/or any combination thereof for implementing the graphics driver 108 of FIGS. 1 and 2 is shown in FIG. 3. The machine readable instructions may be an executable program or portion of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 3, many other methods of implementing the example graphics driver 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Example machine readable instructions 300 that may be executed by the graphics driver 108 for reducing power consumption are illustrated in FIG. 3. With reference to the preceding figures and associated descriptions, the example machine readable instructions 300 of FIG. 3 begin with example graphics driver 108 determining whether a new frame has been detected (block 302). In some examples, the frame update tracker 202 determines whether a new frame has been detected. In response to a new frame being detected, processing transfers to block 304. Conversely, in response to a new frame not being detected, processing transfers to block 306.

At block 304, the example graphics driver 108 resets the software interrupt threshold tracking. In some examples, the frame update tracker 202 resets the software interrupt threshold tracking by resetting a counter, tracker, and/or timer utilized for comparing a time since a prior frame update with the software threshold 116.

At block 306, the example graphics driver 108 determines whether the software interrupt threshold 116 has been satisfied. In some examples, the frame update tracker 202 determines whether the software interrupt threshold has been satisfied. In response to the software interrupt threshold being satisfied, processing transfers to block 308. Conversely, in response to the software interrupt threshold not being satisfied, processing transfers to block 302.

At block 308, the example graphics driver 108 starts software interrupt generation synchronized with hardware interrupts. In some examples, the software interrupt controller 206 starts the software interrupt generation by issuing the software interrupt commands 112 to cause the software-programmable timer 120 to generate software interrupts synchronized with hardware interrupts.

At block 310, the example graphics driver 108 masks the hardware interrupts from the display engine 122. In some examples, the interrupt masker 204 masks the hardware interrupts from the display engine 122 by issuing the mask commands 110 to the VBI logic 128.

At block 312, the example graphics driver 108 determines whether a new frame has been detected. In some examples, the frame update tracker 202 determines whether a new frame has been detected. In response to a new frame being detected, processing transfers to block 314. Conversely, in response to a new frame not being detected, processing transfers to block 320.

At block 314, the example graphics driver 108 unmasks the hardware interrupts from the display engine 122. In some examples, the interrupt masker 204 unmasks the hardware interrupts from the display engine 122 by ceasing to issue the mask commands 110 to the VBI logic 128 or by issuing the mask commands 110 indicating that the hardware interrupts should be unmasked.

At block 316, the example graphics driver 108 disables software interrupts. In some examples, the example software interrupt controller 206 disables generation of software interrupts by ceasing to issue the software interrupt commands 112 or issuing software interrupt commands 112 indicating that the software interrupts should not be generated.

At block 318, the example graphics driver 108 resets the software interrupt threshold tracking. In some examples, the frame update tracker 202 resets the software interrupt threshold tracking by resetting a counter, tracker, and/or timer utilized for comparing a time since a prior frame update with the software threshold 116.

At block 320, the example graphics driver 108 determines whether the hardware interrupt threshold has been satisfied. In some examples, the frame update tracker 202 determines whether the hardware interrupt threshold has been satisfied. In response to the hardware interrupt threshold being satisfied, processing transfers to block 322. Conversely, in response to the hardware interrupt threshold not being satisfied, processing transfers to block 312.

At block 322, the example graphics driver 108 transitions the display engine 122 to the low power state. In some examples, the display engine power controller 208 issues the display engine commands 114 to transition the display engine 122 to the low power state.

At block 324, the example graphics driver 108 determines whether a new frame has been detected. In some examples, the frame update tracker 202 determines whether a new frame has been detected. In response to a new frame being detected, processing transfers to block 326. Conversely, in response to a new frame not being detected, processing returns to block 324.

At block 326, the example graphics driver 108 determines a next interrupt time and a power on delay time for the display engine 122. In some examples, the interrupt synchronizer 210 determines the next interrupt time and the power on delay time for the display engine 122.

At block 328, the example graphics driver 108 powers on the display engine 122 to generate an interrupt at the next interrupt time. In some examples, the display engine power controller 208 issues the display engine commands 114 to cause the display engine 122 to power on and generate a hardware interrupt at the next interrupt time.

At block 330, the example graphics driver 108 disables software interrupts. In some examples, the software interrupt controller 206 disables software interrupts by ceasing to issue the software interrupt commands 112 or issuing the software interrupt commands 112 instructing the software-programmable timer 120 to cease generation of software interrupts.

At block 332, the example graphics driver 108 resets the hardware and software interrupt threshold tracking. In some examples, the frame update tracker 202 resets the hardware and software interrupt threshold tracking.

At block 334, the example graphics driver 108 determines whether to continue monitoring. In response to continuing monitoring, processing transfers to block 302. Conversely, in response to not continuing monitoring, processing terminates.

Figure 4A:
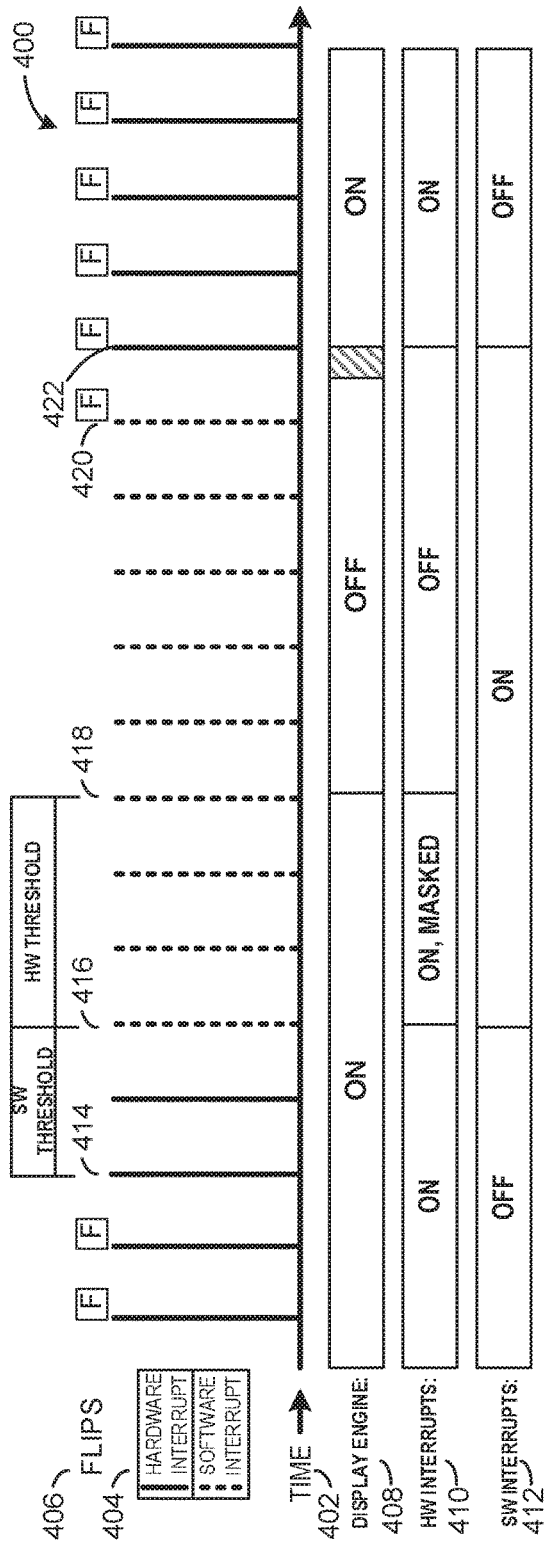
FIG. 4A is a first schematic of a first plurality of interrupts generated utilizing techniques disclosed herein for reducing power consumption of the computing device of FIG. 1.

FIG. 4A is a first schematic 400 of a first plurality of interrupts generated utilizing techniques disclosed herein for reducing power consumption of a computing device. The first schematic 400 includes an example time axis 402, with time values increasing in the direction to the right. The first schematic 400 further includes an example interrupts row 404, illustrating interrupts as vertical lines extending from the time axis 402. Solid vertical lines represent times at which the interrupts 130 are hardware interrupts, while dashed vertical lines represent times at which the interrupts 130 are software interrupts. In some examples, both software and hardware interrupts are being generated, but only the interrupt that is output by the VBI logic 128 is represented as a vertical line in the first schematic 400.

The first schematic 400 further includes an example flips row 406, illustrating frame updates (referred to in some instances herein as flips). When a frame update is detected by the frame update tracker 202, an "F" is illustrated in the flips row 406.

The first schematic 400 includes an example display engine row 408, which displays a current power state of the display engine 122. For example, "ON" represents the display engine 122 being in the operational state, while "OFF" represents the display engine 122 being in the low power state. The portion filled with diagonal lines represents a transition period in which the display engine 122 is transitioning from the low power state to the operational state.

The first schematic 400 includes an example hardware (HW) interrupts row 410 that depicts whether or not the display engine 122 is generating hardware interrupts at any given time. The HW interrupts row 410 lists the status of "ON" when the display engine 122 is generating hardware interrupts, "ON, MASKED" when the display engine 122 is generating hardware interrupts but they are being masked at the VBI logic 128, and "OFF" when the display engine 122 is not generating hardware interrupts.

The first schematic 400 includes an example software (SW) interrupts row 412 that depicts whether or not the software-programmable timer 120 is generating software interrupts at any given time. The SW interrupts row 412 lists the status of "OFF" when the software-programmable timer 120 is not generating software interrupts and lists the status of "ON" when the software-programmable timer 120 is generating software interrupts.

At an example first time 414, a flip is not detected, and the frame update tracker 202 can track a duration and/or count of frames or interrupts since a previous flip to determine whether the software threshold 116 has been satisfied. At the first time 414, the software threshold 116 is not yet satisfied and, thus, the SW interrupts row 412 indicates that software interrupts are not yet generated.

At an example second time 416, the frame update tracker 202 determines that the software threshold 116 has been satisfied. Consequently, the software-programmable timer 120 begins generating software interrupts, and the graphics driver 108 communicates with the VBI logic 128 to mask the hardware interrupts that are generated by the display engine 122.

At an example third time 418, the frame update tracker 202 determines the hardware threshold 118 has been satisfied and the display engine 122 is transitioned to the low power state. As a result, only software interrupts are generated starting at the third time 418.

At an example forth time 420, a flip is detected. In some examples, in response to detecting a flip, the interrupt synchronizer 210 determines a time of the next expected interrupt, and determines a time a start-up time for the display engine 122. In some examples, the power-on time for the display engine 122 is retrieved from a storage location (e.g., a database). The interrupt synchronizer 210 can utilize the start-up time and the time of the next expected interrupt when to indicate to the display engine power controller 208 when to command the display engine 122 to transition to the operational state. In the display engine row 408 of the first schematic 400, the transition to the operational state occurs during the portion of the row that is filled with diagonal shading. As illustrated, the transition culminates at an example fifth time 422, when the display engine 122 is in the operational state and issues a hardware interrupt (e.g., a start-up interrupt that occurs when the display engine 122 launches). At the fifth time 422, the software-programmable timer 120 ceases generating software interrupts. Following the fifth time 422, flips are encountered throughout the remaining period illustrated by the first schematic 400 and, consequently, hardware interrupts are generated and utilized.

Figure 4B:
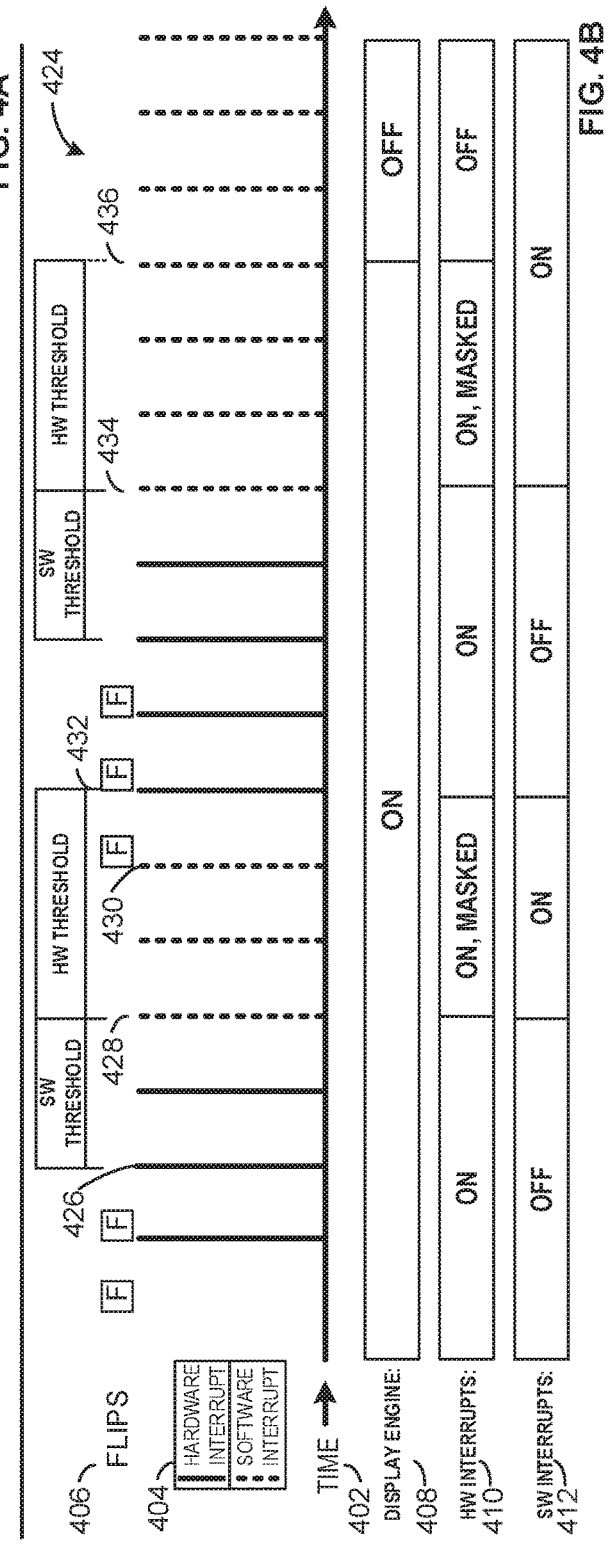
FIG. 4B is a second schematic of a second example plurality of interrupts generated utilizing techniques disclosed herein for reducing power consumption of the computing device of FIG. 1.

FIG. 4B is a second schematic 424 of a second example plurality of interrupts generated utilizing techniques disclosed herein for reducing power consumption of a computing device. The second schematic 424 includes the time axis 402, the interrupts row 404, the flips row 406, the display engine row 408, the hardware interrupts row 410, and the software interrupts row 412, as in the first schematic 400. However, the second schematic 424 includes the second plurality of interrupts to illustrate another possible scenario in which hybrid interrupt offloading is employed.

At an example sixth time 426, a flip is not detected, and the frame update tracker 202 counts an additional interrupt, frame, and/or duration since the previous flip has occurred. The frame update tracker 202 determines that the software threshold 116 has not been satisfied and, thus, the display engine 122 continues to generate hardware interrupts.

At an example seventh time 428, the frame update tracker 202 determines that the software threshold 116 has been satisfied. The software-programmable timer 120 generates software interrupts beginning at the seventh time 428, and the hardware interrupts are masked while both the software and hardware interrupts are being generated.

At an example eighth time 430, the frame update tracker 202 detects a flip. As a result, the software interrupts transition cease after the eighth time 430. Additionally, the masking of the hardware interrupts is turned off at a ninth time 432, thus reverting to the VBI logic 128 issuing the hardware interrupts generated by the display engine 122 as the interrupts 130.

At an example tenth time 434, the frame update tracker 202 determines that the software threshold 116 has been satisfied. In response to the software threshold 116 being satisfied, software interrupts are generated and the hardware interrupts are masked at the VBI logic 128.

At an example eleventh time 436, the frame update tracker 202 determines that the hardware threshold 118 has been satisfied and, consequently, the display engine power controller 280 issues the display engine commands 114 to cause the display engine 122 to transition to the low power state.

Figure 5:
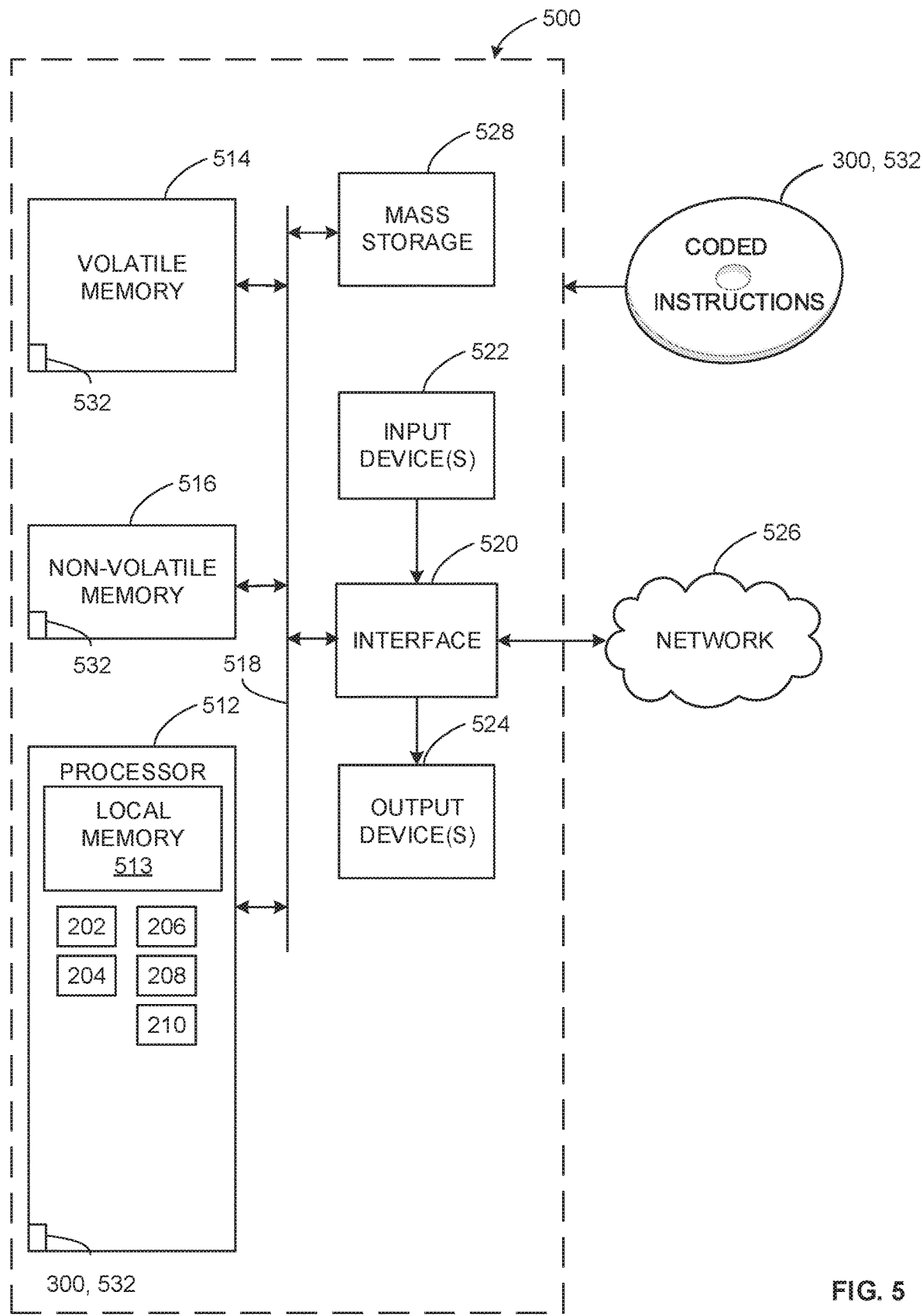
FIG. 5 is a block diagram of an example processor platform structured to execute the example machine readable instructions of FIG. 3 to implement the graphics driver of FIGS. 1 and 2.

FIG. 5 is a block diagram of an example processor platform 500 structured to execute the instructions of FIG. 3 to implement the graphics driver 108 of FIGS. 1 and 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example frame update tracker 202, the example interrupt masker 204, the example software interrupt controller 206, the example display engine power controller 208, and/or the example interrupt synchronizer 210.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 300, 532 of FIG. 3 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that enable power savings on a computing device by utilizing a hybrid approach alternating between software-generated interrupts and hardware-generated interrupts to enable a display engine of the computing device to transition to a low power state when frame updates are not being detected. Examples disclosed herein deterministically avoid software-hardware race conditions and the resulting visual artifacts (e.g., tears) such race conditions create, while allowing the display engine to be aggressively power managed even when applications persistently request interrupts. Further, examples disclosed herein utilized a tuned software threshold and a tuned hardware threshold to optimize power usage without resulting in fast-switching hysteresis effects from continually power-cycling the display engine. The disclosed methods, apparatus and articles of manufacture improve the efficiency of a computing device by offloading hardware-generated interrupts and utilizing software-generated interrupts whenever possible to conserve power normally consumed by a continually-running display engine. The disclosed methods, apparatus and articles of manufacture are accordingly directed to one or more improvement(s) in the functioning of a computer.

Example 1 includes an apparatus comprising a frame update tracker to detect frame updates corresponding to input frames to be presented by a display, a software interrupt controller to cause a programmable timer to generate second interrupts corresponding to first interrupts generated by a display engine, the interrupt controller to cause the programmable timer to generate the second interrupts when there are no frame updates detected for at least a first duration of time defined by a first threshold, and a display engine power controller to cause the display engine to transition to a low power state when (1) the programmable timer is configured to generate the second interrupts and (2) no frame updates have been detected for at least a second duration of time following the first duration of time, the second duration of time defined by a second threshold.

Example 2 includes the apparatus of example 1, further including an interrupt masker to cause the first interrupts to be masked when (1) the second interrupts are being generated and (2) the display engine is not in the low power state.

Example 3 includes the apparatus of example 2, wherein the interrupt masker is to cause the first interrupts to be unmasked in response to the frame update tracker detecting a frame update while the first interrupts are masked.

Example 4 includes the apparatus of example 1, further including an interrupt synchronizer to, in response to the frame update tracker detecting a frame update when the display engine is in the low power state determine an expected time of a next interrupt of the second interrupts, access a power-on time for the display engine, and cause the display engine to transition from the low power state to an operational state such that the display engine generates a startup interrupt of the first interrupts within a tolerance range of the expected time of the next interrupt of the second interrupts.

Example 5 includes the apparatus of example 4, wherein in response to the display engine transitioning from the low power state to the operational state, the software interrupt controller causes the programmable timer to cease generating the second interrupts.

Example 6 includes the apparatus of example 1, further including an interrupt synchronizer to cause the programmable timer to generate the second interrupts synchronized within a tolerance range of the first interrupts generated by the display engine.

Example 7 includes the apparatus of example 1, wherein the first interrupts and the second interrupts include at least one of a vertical blanking interrupt, a vsync interrupt, a vblank interval, or a horizontal blanking interval.

Example 8 includes the apparatus of example 1, wherein the first threshold corresponds to an amount of time for a specified number of input frames to be detected.

Example 9 includes a non-transitory computer readable storage medium comprising computer readable instructions that, when executed, cause a processor to detect frame updates corresponding to input frames to be presented by a display, cause a programmable timer to generate second interrupts corresponding to first interrupts generated by a display engine, the second interrupts to be generated when there are no frame updates detected for at least a first duration of time defined by a first threshold, and cause the display engine to transition to a low power state when (1) the programmable timer is configured to generate the second interrupts and (2) no frame updates have been detected for at least a second duration of time following the first duration of time, the second duration of time defined by a second threshold.

Example 10 includes the non-transitory computer readable storage medium of example 9, wherein the instructions, when executed, cause the processor to cause the first interrupts to be masked when (1) the second interrupts are being generated and (2) the display engine is not in the low power state.

Example 11 includes the non-transitory computer readable storage medium of example 10, wherein the instructions, when executed, cause the processor to cause the first interrupts to be unmasked in response to the frame update tracker detecting a frame update while the first interrupts are masked.

Example 12 includes the non-transitory computer readable storage medium of example 9, wherein the instructions, when executed, cause the processor to, in response to a frame update when the display engine is in the lower power state determine an expected time of a next interrupt of the second interrupts, access a power-on time for the display engine, and cause the display engine to transition from the low power state to an operational state such that the display engine generates a startup interrupt of the first interrupts within a tolerance range of the expected time of the next interrupt of the second interrupts.

Example 13 includes the non-transitory computer readable storage medium of example 12, wherein the instructions, when executed, further cause the processor to, in response to the display engine transitioning from the low power state to the operational state, cause the programmable timer to cease generating the second interrupts.

Example 14 includes the non-transitory computer readable storage medium of example 9, wherein the instructions, when executed, further cause the processor to cause the programmable timer to generate the second interrupts synchronized within a tolerance range of the first interrupts generated by the display engine.

Example 15 includes the non-transitory computer readable storage medium of example 9, wherein the first interrupts and the second interrupts include at least one of a vertical blanking interrupt, a vsync interrupt, a vblank interrupt, or a horizontal blanking interval.

Example 16 includes the non-transitory computer readable storage medium of example 9, wherein the first threshold corresponds to an amount of time for a specified number of input frames to be detected.

Example 17 includes a method comprising detecting frame updates corresponding to input frames to be presented by a display, causing a programmable timer to generate second interrupts corresponding to first interrupts generated by a display engine, the second interrupts to be generated when there are no frame updates detected for at least a first duration of time defined by a first threshold, and causing the display engine to transition to a low power state when (1) the programmable timer is configured to generate the second interrupts and (2) no frame updates have been detected for at least a second duration of time following the first duration of time, the second duration of time defined by a second threshold.

Example 18 includes the method of example 17, further including causing the first interrupts to be masked when (1) the second interrupts are being generated and (2) the display engine is not in the low power state.

Example 19 includes the method of example 18, further including causing the first interrupts to be unmasked in response to detecting a frame update while the first interrupts are masked.

Example 20 includes the method of example 17, further including, in response to detecting a frame update when the display engine is in the low power state determining an expected time of a next interrupt of the second interrupts, accessing a power-on time for the display engine, and cause the display engine to transition from the low power state to an operational state such that the display engine generates a startup interrupt of the first interrupts within a tolerance range of the expected time of the next interrupt of the second interrupts.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory; and
   at least one processor to execute computer readable instructions to:
   initiate generation of second interrupts by a programmable timer in response to a first determination that no frame updates have occurred for at least a first threshold duration of time, the second interrupts to correspond to first interrupts generated by a display engine;
   mask the first interrupts when the second interrupts are generated; and
   cause the display engine to transition to a low power state in response to a second determination that no frame updates have occurred for at least a second threshold duration of time after the generation of the second interrupts has been initiated.

2. The apparatus of claim 1, wherein the at least one processor is to unmask the first interrupts in response to detection of a frame update when the first interrupts are masked.

3. The apparatus of claim 1, wherein, in response to detection of a frame update when the display engine is in the low power state, the at least one processor is to:
   determine an expected time of a next interrupt of the second interrupts;

access a power-on time for the display engine; and cause the display engine to transition from the low power state to an operational state such that the display engine is to generate a startup interrupt of the first interrupts within a tolerance range of the expected time of the next interrupt of the second interrupts.

4. The apparatus of claim 3, wherein the at least one processor is to cause the programmable timer to cease the generation of the second interrupts after the display engine transitions from the low power state to the operational state.

5. The apparatus of claim 1, wherein the at least one processor is to cause the programmable timer to generate the second interrupts synchronized within a tolerance range of the first interrupts generated by the display engine.

6. The apparatus of claim 1, wherein the first interrupts and the second interrupts include at least one of a vertical blanking interrupt, a VSYNC interrupt, a VBLANK interval, or a horizontal blanking interval.

7. The apparatus of claim 1, wherein the first threshold duration of time corresponds to an amount of time for a specified number of input frames to be detected.

8. At least one non-transitory computer readable storage medium comprising computer readable instructions that, when executed, cause at least one processor to at least:

initiate generation of second interrupts by a programmable timer in response to a first determination that no frame updates have occurred for at least a first threshold duration of time, the second interrupts to correspond to first interrupts generated by a display engine;

mask the first interrupts when the second interrupts are generated; and cause the display engine to transition to a low power state in response to a second determination that no frame updates have occurred for at least a second threshold duration of time after the generation of the second interrupts has been initiated.

9. The at least one non-transitory computer readable storage medium of claim 8, wherein the instructions cause the at least one processor to unmask the first interrupts in response to detection of a frame update when the first interrupts are masked.

10. The at least one non-transitory computer readable storage medium of claim 8, wherein the instructions cause the processor to, in response to detection of a frame update when the display engine is in the lower power state:

determine an expected time of a next interrupt of the second interrupts;

access a power-on time for the display engine; and cause the display engine to transition from the low power state to an operational state such that the display engine is to generate a startup interrupt of the first interrupts within a tolerance range of the expected time of the next interrupt of the second interrupts.

11. The at least one non-transitory computer readable storage medium of claim 10, wherein the instructions cause the processor to cause the programmable timer to cease the generation of the second interrupts after the display engine transitions from the low power state to the operational state.

12. The at least one non-transitory computer readable storage medium of claim 8, wherein the instructions cause the processor to cause the programmable timer to generate the second interrupts synchronized within a tolerance range of the first interrupts generated by the display engine.

13. The at least one non-transitory computer readable storage medium of claim 8, wherein the first interrupts and the second interrupts include at least one of a vertical blanking interrupt, a VSYNC interrupt, a VBLANK interrupt, or a horizontal blanking interval.

14. The at least one non-transitory computer readable storage medium of claim 8, wherein the first threshold corresponds to an amount of time for a specified number of input frames to be detected.

15. A method comprising:

initiating, by executing an instruction with at least one processor, generation of second interrupts by a programmable timer in response to a first determination that no frame updates have occurred for at least a first threshold duration of time, the second interrupts to correspond to first interrupts generated by a display engine;

masking, by executing an instruction with the at least one processor, the first interrupts when the second interrupts are generated; and causing the display engine to transition to a low power state in response to a second determination that no frame updates have occurred for at least a second threshold duration of time after the generation of the second interrupts has been initiated.

16. The method of claim 15, further including unmasking the first interrupts in response to detecting a frame update occurring when the first interrupts are masked.

17. The method of claim 15, further including, in response to detecting a frame update when the display engine is in the low power state:

determining an expected time of a next interrupt of the second interrupts;

accessing a power-on time for the display engine; and causing the display engine to transition from the low power state to an operational state such that the display engine generates a startup interrupt of the first interrupts within a tolerance range of the expected time of the next interrupt of the second interrupts.

18. The method of claim 17, further including causing the programmable timer to cease the generation of the second interrupts after the display engine transitions from the low power state to the operational states.

19. The method of claim 15, wherein the initiating of the generation of the second interrupts includes causing the programmable timer to generate the second interrupts synchronized within a tolerance range of the first interrupts generated by the display engine.

20. The method of claim 15, wherein the first interrupts and the second interrupts include at least one of a vertical blanking interrupt, a VSYNC interrupt, a VBLANK interval, or a horizontal blanking interval.

\* \* \* \* \*